United States Patent [19]

Le Van Mao et al.

[11] Patent Number: 5,135,898
[45] Date of Patent: Aug. 4, 1992

[54] CATALYSTS FOR THE AROMATIZATION OF LIGHT PARAFFINS AND OLEFINS

[75] Inventors: Raymond Le Van Mao, Saint-Laurent; Jianhua Yao, Verdun, both of Canada

[73] Assignee: Societe Quebecoise D'Initiatives Petrolieres (Soquip), Quebec, Canada

[21] Appl. No.: 735,429

[22] Filed: Jul. 25, 1991

[51] Int. Cl.$^5$ .......................... B01J 29/28; B01J 23/08
[52] U.S. Cl. ..................................... 502/61; 502/68; 502/71
[58] Field of Search .......................... 502/61, 68, 71

[56] References Cited

U.S. PATENT DOCUMENTS

| | | | |
|---|---|---|---|
| 4,136,060 | 1/1979 | Bertolacini et al. | 502/61 |
| 4,392,003 | 7/1983 | Kolombos et al. | 502/61 |
| 4,485,185 | 11/1984 | Onodera et al. | 502/71 |

FOREIGN PATENT DOCUMENTS 24147  2/1981  European Pat. Off. .............. 502/61

OTHER PUBLICATIONS

Catalysis Letters 6 (1990) 23–32.
Applied Catalysis, 65 (1990) 143–157.
Applied Catalysis, 65 (1990) 175–188.

*Primary Examiner*—Carl F. Dees
*Attorney, Agent, or Firm*—Merchant, Gould, Smith, Edell, Welter & Schmidt

[57] ABSTRACT

In accordance with the present invention, there is now provided a hybrid catalyst suitable for the aromatization of light paraffins and olefins, comprising a mixture of a pentasil type zeolite having the structure of ZSM-5 or ZSM-11, and a cocatalyst consisting of gallium oxide supported by an oxide selected from the group consisting of silica, alumina particles and chromium oxide particles.

18 Claims, No Drawings

CATALYSTS FOR THE AROMATIZATION OF LIGHT PARAFFINS AND OLEFINS

BACKGROUND OF THE INVENTION

This invention relates to catalysts suitable for aromatization of paraffins and olefins, a method of making such catalysts, and an aromatization process using same.

Aromatic hydrocarbons are important chemicals in the petroleum industry. The most commercially valuable aromatics are the BTX compounds such as benzene, toluene, ethylbenzene and xylenes. Aromatics are currently produced by catalytic cracking of naphthas, catalytic reforming of various petroleum feedstocks etc. They can also be produced by catalytic conversion of alcohols, particularly methanol, or olefins. The catalysts used in these processes, like methanol-to-gasoline or MTG developed by Mobil Oil, or olefins-to-gasoline-and-distillate (MOGD) or M2 Forming, also developed by Mobil Oil, belong to the pentasil zeolite family whose most important member in terms of industrial applications is the ZSM-5 zeolite structure. The latter is a tridimensional crystalline aluminosilicate having strong acid sites and whose intermediate pore (or channel) system displays a reaction shape and size selectivity which leads to the production of substantial amounts of monoaromatics. In the M2 Forming and MOGD processes, the ZSM-5 zeolite is used in its acid form alone without any cocatalyst.

Pentasil zeolites have been known for a number of years. The ZSM-5 zeolite is described and claimed in U.S. Pat. No. 3,702,886, while ZSM-11 is described in U.S. Pat. No. 3,709,979.

Zinc oxide and gallium oxide are known as modifiers of zeolite catalysts for the aromatization of hydrocarbons, particularly light alkanes such as ethane, propane and butane. In particular, the so-called Cyclar process developed jointly by British Petroleum and United Oil Products, is commercially employed for the conversion of propane and butanes to aromatics. The catalyst used is a gallium ZSM-5 zeolite. Such catalysts are usually prepared by wet impregnation of a gallium salt onto the acidic surface of the zeolite, or by ion-exchange.

In U.S. Pat. No. 4,975,402 (Le Van Mao et. al.), it has been observed that ZnO species did not require to be adjacent to the zeolite acid sites to be efficient as aromatization cocatalysts. Indeed, by simply setting the zinc bearing cocatalyst in physical contact with the zeolite particles and embedding the two catalyst components in an inert carrier, hybrid catalysts exhibiting high performance in the aromatization of light olefins and paraffins were obtained.

SUMMARY OF THE INVENTION

In accordance with the present invention, there is now provided a hybrid catalyst suitable for the aromatization of light paraffins and olefins, comprising a mixture of a pentasil type zeolite having the structure of ZSM-5 or ZSM-11, and a cocatalyst. More specifically, the hybrid catalyst of the present invention comprises a pentasil zeolite having the structure of ZSM-5 and ZSM-11, in admixture with a cocatalyst consisting of gallium oxide supported by an oxide selected from the group consisting of silica, alumina particles and chromium oxide particles. The term silica includes colloidal silica, silica gel, quartz, and the like. Preferably, the silicon/aluminium atom ratio in the zeolite is ranging from about 25 to about 50. A weight ratio of zeolite/gallium oxide cocatalyst of about 4.7 to about 26.7 is preferred.

In another aspect of the present invention, the hybrid catalyst is embedded in from about 3 to about 20% by weight of an inert carrier, preferably, bentonite.

In further aspect of the invention, there is provided a method for preparing a hybrid catalyst suitable for the aromatization of light paraffins and olefins.

DETAILED DESCRIPTION OF THE INVENTION

The hybrid catalysts of the present invention containing the ZSM-5 zeolite have been found to give greater yields of aromatics and particularly BTX aromatics than a non-modified ZSM-5 zeolite in the acid form or a Cyclar-type catalyst. Because of its structural similarities with ZSM-5, ZSM-11 behaves in the same manner as ZSM-5. As used in this specification, the expression "zeolite having the structure of ZSM-5 or ZSM-11" is meant to include zeolites in which the aluminium atoms are substituted totally or in part by other atoms, e.g. gallium.

It is believed that the supported gallium cocatalyst, in the presence of a pentasil zeolite, behaves as a hydrogen "trap", thus scavenging the hydrogen species released during the aromatization of paraffinic and olefinic compounds. The aromatization reaction occurs within the zeolite channels and the generated hydrogen species migrate to the cocatalyst particles located on the outside of the zeolite particles.

The method of preparation of aromatization catalysts of the present invention comprises:

(a) dissolving a water-soluble gallium salt in water; the solution thus obtained is added to colloidal silica, and the resulting mixture is thoroughly stirred for a few minutes;

(b) evaporating to dryness the obtained solution on a hot plate, and the resulting solid was further dried and activated in air at elevated temperature; preferably, the temperature of drying is about 120° C. and the temperature of activation is about 550° C.;

(c) mixing the gallium containing cocatalyst of step (b) with a pentasil type zeolite and embedding the solid mixture in an inert carrier (weight balance). Extrudates are then formed from this solid mixture by adding water to obtain a malleable paste; and (d) drying the extrudates and activation in air at elevated temperature, provides the desired hybrid catalyst of the present invention.

Colloidal silica can be replaced as the gallium oxide support by silica, such as quartz or silica gel, alumina or chromium oxide particles. The method of preparation of the hybrid catalyst then comprises:

impregnating a gallium salt solution onto the silica, alumina or chromium oxide particles;

drying and activating the resulting solid at an elevated temperature;

mixing the obtained gallium oxide cocatalyst with a pentasil type zeolite having the structure of ZSM-5 or ZSM-11, and embedding the solid mixture in an inert carrier; and activating the resulting hybrid catalyst at an elevated temperature.

PREPARATION OF ZEOLITE

The ZSM-5 zeolite was synthesized according to U.S. Pat. No. 3,702,886 and the ZSM-11 according to U.S. Pat. No. 3,709,979. The composition of the synthesis gel and the experimental parameters were selected so that the resulting zeolites had a Si/Al atomic ratio ranging from about 25 to about 50.

CATALYTIC TESTING

The catalyst was loaded in the form of extrudates in a tubular quartz reactor and heated by a digitally controlled electrical furnace. A chromel-alumel thermocouple was placed in the catalyst bed and was used in conjunction with a digital thermometer unit to monitor the temperature of the catalyst bed. n-butane (paraffin used as feed) and nitrogen, used as carrier gas were supplied from cylinders. The control of flow-rates was done through automatic devices. The gaseous mixture flowing out of the reactor ran through a series of condensers maintained at 5°-10° C., to a liquid collector immersed in an ice bath followed by a dynamic gas sampling bulb from which gas sampling was carried out. During the reaction, while the liquids were being collected, the gases were analyzed periodically by gas chromatography using a 5 m long column packed with Chromosorb P coated with 20% by weight of squalane connected in series with a 2.5 m long column packed with Carbopack C graphite modified with picric acid (0.19% by weight). The GC used was a dual FID Hewlett-Packard Model 5790 equipped with a 3392A Model integrator. It was also equipped with a capillary column (length 50 m; PONA type fused silica coated with a crosslinked polymer) which was used for accurate analysis of the liquid fractions after a completed run.

The reactor parameters were as follows: temperature = 540° C., W.H.S.V. (weight hourly space velocity or g of injected paraffin per hour and per gram of catalyst) = 0.5 h$^{-1}$, flow rate of nitrogen = 10 ml/min, weight of catalyst = 4 g and duration of a run = 4 h.

The total conversation of n-butane is defined as follows:

$$C_t(C \text{ atom } \%) = \frac{(NC)_F - (NC)_P}{(NC)_F} \times 100$$

wherein $(NC)_F$ and $(NC)_P$ are the numbers of carbon atoms of n-butane in the feed and in the reactor outstream, respectively.

The yield of aromatics is defined as follows:

$$Y_{Ar}(C \text{ atom } \%) = \frac{(NC)_{Ar}}{(NC)_F} \times 100$$

wherein $(NC)_{Ar}$ is the number of carbon atoms of aromatic products.

The following examples are provided to illustrate the present invention rather than limiting its scope.

EXAMPLE 1

The ZSM-5 zeolite was converted into the acid form (H-ZSM-5) by ion-exchange with a 5 wt % ammonium chloride solution followed by drying at 120° C. for 10 h and activating by calcination in air at 550° C. for 10 h. The resulting H-ZSM-5 zeolite was characterized by various techniques i.e. X-ray powder diffraction, atomic absorption, scanning electron microscopy, BET surface area measurements, and exhibited the following physico-chemical characteristics:

Si/Al atomic ratio = 36, degree of crystallinity = 100%, BET surface area = 413 m$^2$/g, Na$_2$O = less than 0.2 wt % and average particle size = 3 μm.

Proceeding in the same manner, the ZSM-11 zeolite was converted to its acid form (H-ZSM-11).

To prepare the final catalyst, H-ZSM-5 or H-ZSM-11 (80 wt %) and bentonite (20 wt %) were mixed. Water was added dropwise to the mixture until a malleable paste was obtained. The latter was extruded into 1 mm O.D. "spaghettis". The final extrudates were dried at 120° C. for 10 h and activated in air at 550° C. for 10 h, giving the desired H-ZSM-5 or H-ZSM-11 catalysts.

The H-ZSM-5 catalyst was tested in the reactor and the catalytic results are reported in Table 1.

EXAMPLE 2

A gallium bearing catalyst was prepared in a similar manner to that of the Cyclar process. Briefly, gallium was incorporated to the H-ZSM-5 zeolite powder by refluxing for 24 h a 0.06M solution of gallium nitrate (5.6 ml per gram of zeolite). The resulting solid was then recovered by evaporating the gallium nitrate solution and finally activated in air for 10 h at 550° C. The gallium oxide content was 3.0 weight %.

The final extrudates were prepared by using the method previously described in Example 1 (weight % of bentonite: 20). The catalytic results obtained with this H-ZSM-5 (Cy) sample are reported in Table 1.

EXAMPLE 3

Gallium Oxide-Colloidal Silica Cocatalyst 2.3 g of gallium nitrate (13 H$_2$O) were dissolved in 5 ml of water. This solution was added to 4.5 g of Ludox TM (AS-40) colloidal silica manufactured and sold by DuPont Corp., and the resulting mixture was stirred for a few minutes. Then the solution was gently evaporated to dryness on a hot plate. The resulting solid was further dried at 120° C. for 10 h and activated in air at 550° C. for 10 h. This cocatalyst will be referred to as Ga/LuSi.

EXAMPLE 4

Gallium Oxide/Cr$_2$O$_3$ Cocatalyst 1.6 of gallium nitrate were dissolved in 4.0 ml of water. This solution was added under gentle stirring to 1.3 g of Cr$_2$O$_3$ powder. The suspension was allowed to stand overnight at room temperature. The resulting wet solid was dried at 120° C. for 10 h and activated in air at 550° C. for 10 h. This cocatalyst will be referred to as Ga/Cr.

EXAMPLE 5

Gallium Oxide-Silica Gel, Gallium Oxide-Quartz, and Gallium Oxide-Alumina Cocatalysts Ga was incorporated onto the surface of silica or alumina in the same manner as in Example 4, except that the silica and the alumina replaced the chromium oxide. The silicas used in the preparation of the present cocatalysts were: silica gel manufactured and sold by Grace, having a BET surface area = 580 m$^2$/g, and crushed quartz manufactured and sold by Fisher, with a surface area = 0.4 m$^2$/g. The aluminas used were: activated aluminas acid and basic powders, manufactured and sold by Strem Chem., with a surface area of 146 and 171 m$^2$/g respectively, and neutral activated alumina, 70–230 mesh, manufactured and sold by Merck, with a surface area = 133 m²/g.

These cocatalysts will be referred to as Ga/SiGel (Silica gel), Ga/QU (Quartz), Ga/AlAc (acidic alumina), Ga/AlBa (basic alumina) and Ga/AlNe (neutral alumina) respectively.

EXAMPLE 6

The H-ZSM-5 zeolite powder prepared in Example 1 (80 weight %) and the Ga/LuSi cocatalyst (16 weight %) prepared in Example 3 were mixed at room temperature. Then, the solid mixture was extruded with bentonite (4 weight %) in the presence of water, dried and activated at high temperature as described in Example 1. The final hybrid catalyst which is referred to as H-ZSM-5/Ga/LuSi contains 3 wt % of gallium oxide, and its catalytic properties are reported in Table 1.

By substituting the H-ZSM-5 with H-ZSM-11, the H-ZSM-11/Ga/Cr catalyst was also obtained.

EXAMPLE 7

The H-ZSM-5 zeolite powder prepared in Example 1 (80 weight %) and the Ga/Cr cocatalyst (16 weight %) prepared in Example 4 were mixed at room temperature. Then, the solid mixture was extruded with bentonite (4 weight %), in the presence of water, dried and activated at high temperature as previously described in Example 1. The final hybrid catalyst which is referred to as H-ZSM-5/Ga/Cr, is treated at 540° C. for 2 h under hydrogen atmosphere before the catalytic testing. The catalytic properties of such a hybrid catalyst, which contains 3 wt % of gallium oxide, are also reported in Table 1.

By substituting the H-ZSM-5 with H-ZSM-11, the H-ZSM-11/Ga/Cr catalyst was also obtained.

EXAMPLE 8

The H-ZSM-5 zeolite powder prepared in Example 1 (80 weight %) and the Ga/SiGel cocatalyst (16 weight %) prepared in Example 5 were mixed at room temperature. The solid mixture was then extruded with bentonite (4 weight %) in the presence of water, dried and activated at high temperature as described previously in Example 1. The final hybrid catalyst which is referred to as H-ZSM-5/Ga/SiGel contains 3 wt % of gallium oxide, and its catalytic properties are reported in Table 1.

By substituting the H-ZSM-5 with H-ZSM-11, an H-ZSM-11/Ga/SiGel catalyst was obtained.

EXAMPLE 9

The H-ZSM-5 zeolite powder prepared in Example 1 (80 weight %) and the GA/SiQU (quartz particle size = 90 microns) cocatalyst (16 weight %) prepared in Example 5 were mixed at room temperature. The solid mixture was extruded with bentonite (4 weight %) in the presence of water, dried and activated at high temperature as described in Example 1. The final hybrid catalyst which is referred to as H-ZSM-5/Ga/SiQU, contains 3 wt % of gallium oxide, and its catalytic properties are reported in Table 1.

By substituting the H-ZSM-5 with H-ZSM-11, and H-ZSM-11/Ga/SiQU catalyst was obtained.

EXAMPLE 10

The H-ZSM-5 zeolite powder prepared in Example 1 (80 weight %) and the Ga/AlAc cocatalyst (16 weight %) prepared in Example 5 were mixed at room temperature. The solid mixture was extruded with bentonite (4 weight %) in the presence of water, dried and activated at high temperature as described in Example 1. The final hybrid catalyst which is referred to as H-ZSM-5/Ga/AlAc, contains 3 wt % of gallium oxide, and its catalytic properties are reported in Table 1.

By substituting the H-ZSM-5 with H-ZSM-11, an H-ZSM-11/Ga/AlAc catalyst was obtained.

EXAMPLE 11

The H-ZSM-5 zeolite powder prepared in Example 1 (80 weight %) and the Ga/AlBa cocatalyst (16 weight %) prepared in Example 5 were mixed at room temperature. The solid mixture was extruded with bentonite (4 weight %) in the presence of water, dried and activated at high temperature as described in Example 1. The final hybrid catalyst which is referred to as H-ZSM-5/Ga/AlBa, contains 3 wt % of gallium oxide, and its catalytic properties are reported in Table 1.

By substituting the H-ZSM-5 with H-ZSM-11, an H-ZSM-11/Ga/AlBa catalyst was obtained.

EXAMPLE 12

The H-ZSM-5 zeolite powder prepared in Example 1 (80 weight %) and the Ga/AlNe cocatalyst (16 weight %) prepared in Example 5 were mixed at room temperature. The solid mixture was extruded with bentonite (4 weight %) in the presence of water, dried and activated at high temperature as described in Example 1. The final hybrid catalyst which is referred to as H-ZSM-5/Ga/AlNe, contains 3 wt % of gallium oxide, and its catalytic properties are reported in Table 1.

By substituting the H-ZSM-5 with H-ZSM-11, an H-ZSM-11/Ga/AlNe catalyst was obtained.

TABLE 1

| | Aromatization activity of the reference catalysts and of the hybrid catalysts of the present invention which contain supported gallium oxide as cocatalyst. | | |
|---|---|---|---|
| Example number | Catalyst | Total conversion of n-butane, $C_t$ (C atom %) | Aromatic Yield, $Y_{Ar}$ (C atom %) |
| 1 | H-ZSM-5 | 81.4 | 16.6 |
| 2 | H-ZSM-5 (Cy) | 82.3 | 40.5 |
| 6 | H-ZSM-5/Ga/LuSi | 98.7 | 64.3 |
| 7 | H-ZSM-5/Ga/Cr | 99.3 | 68.1 |
| 8 | H-ZSM-5/Ga/SiGel | 96.9 | 51.6 |
| 9 | H-ZSM-5/Ga/SiQU | 96.9 | 50.1 |
| 10 | H-ZSM-5/Ga/AlAc | 98.3 | 45.6 |
| 11 | H-ZSM-5/Ga/AlBa | 98.4 | 43.7 |
| 12 | H-ZSM-5/Ga/AlNe | 98.1 | 42.9 |

In these experiments, the analysis of the mixture of aromatic products obtained by the use of the catalysts of the present invention revealed a BTX aromatics content as follows:

benzene 35–38%;
toluene 38–42%;
xylenes 9–13%;
ethylbenzene ≈ 1%;
styrene ≈ 0.2%; and the remaining being aromatics of 9 to 11 carbon atoms.

EXAMPLE 13

Ludox ™ colloidal silica was evaporated to dryness on a hot plate. The resulting solid was dried at 120° C. for 10 h and activated at 550° C. for 10 h. Such powder particles (13 weight %) and the H-ZSM-5 zeolite powder prepared in Example 1 (80 weight %) were mixed at room temperature. The solid mixture was extruded with bentonite (7 weight %) in the presence of water, dried and activated at high temperature as described in Example 1. The final hybrid catalyst which is referred to as H-ZSM-5/LuSi, showed the catalytic properties reported in Table 2.

A similar H-ZSM-11/LuSi catalyst was also obtained by replacing H-ZSM-5 by H-ZSM-11.

EXAMPLES 14–18

In these examples, particles of the following "inert" oxide materials are used as cocatalysts: quartz (particle size=90 microns), silica gel, acidic alumina, basic alumina and neutral alumina, respectively.

The H-ZSM-5 zeolite powder prepared in Example 1 (80 weight %) and the inert oxide particles (13 weight %) were mixed at room temperature. The solid mixture was then extruded with bentonite (7 weight %) in the presence of water, dried and activated at high temperature as described in Example 1. The final hybrid catalysts which are respectively referred to as H-ZSM-5/SiQU, H-ZSM-5/SiGel, H-ZSM-5/AlAc, H-ZSM-5/AlBa and H-ZSM-5/AlNe, showed the catalytic properties reported in Table 2.

Similar H-ZSM-11/SiQU, H-ZSM-11/SiGel, H-ZSM-11/AlAc, H-ZSM-11/AlBa and H-ZSM-11/AlNe were also obtained by replacing the H-ZSM-5by H-ZSM-11.

TABLE 2

Aromatization activity of the reference catalysts and the hybrid catalysts of this invention which contain particles of "inert" oxide materials

| Example number | Catalyst | Total conversion of n-butane. $C_t$ (C atom %) | Aromatic Yield. $Y_{Ar}$ (C atom %) |
|---|---|---|---|
| 1 | H-ZSM-5 | 81.4 | 16.6 |
| 2 | H-ZSM-5 (Cy) | 82.3 | 40.5 |
| 13 | H-ZSM-5/LuSi | 90.5 | 37.7 |
| 14 | H-ZSM-5/SiQU | 96.7 | 28.6 |
| 15 | H-ZSM-5/SiGel | 94.7 | 31.5 |
| 16 | H-ZSM-5/AlAc | 97.3 | 32.6 |
| 17 | H-ZSM-5/AlBa | 97.7 | 31.0 |
| 18 | H-ZSM-5/AlNe | 97.7 | 33.4 |

DISCUSSION OF THE CATALYTIC RESULTS

All the hybrid catalysts prepared according to the procedure of the invention and containing supported gallium oxide, display yields of aromatics higher than the catalyst prepared according to the classical concept of bifunctional catalysis, such as Cyclar-type catalysts (H-ZSM-5 (Cy)). Although the aromatization promoting effect of the gallium species is essential, the support itself plays also a very important role. Since it is assumed that the active Ga species have an oxidation degree lower than +3 and are formed during the reaction itself, the dispersion of gallium oxide on the support surface is believed to be the key factor. This is the reason why the Ga/LuSi cocatalyst obtained by coevaporation of a mixture of gallium salt and colloidal silica is among the most preferred cocatalysts of the invention: it presents the highest dispersion of Ga oxide and consequently, the in situ conversion of Ga species into its active form is very rapid, the conversion being completed after a few minutes of reaction. In the case of the Ga/Cr cocatalyst, a reduction operation is necessary prior to the catalytic testing probably because of the oxidizing nature of $Cr_2O_3$ surface, which prevents the gallium oxide to reach rapidly its most active form.

The inert carrier plays also an important role. It helps the hybrid catalysts to maintain the configuration which is most suitable for maximum interactions between the zeolite component and the cocatalyst, thus providing maximum aromatization activity.

The importance of the contact surface between the zeolite and the cocatalyst particles is demonstrated by the following series of experiments. Particles of pure α-quartz were used as cocatalysts. The amount and the size of the quartz particles within the hybrid catalysts were changed and the results are reported in Table 3. As it can be seen therein, even in the absence of gallium, higher conversion of n-butane and higher production of aromatics and molecular hydrogen are obtained with pure quartz used as cocatalyst. Such hybrid catalysts exhibit higher production of aromatics and hydrogen when higher amounts of quartz are embedded within the hybrid catalyst and when the particle size of quartz is smaller.

The hybrid catalyst, H-ZSM-5/LuSi, which comprises particles obtained by the evaporation of the Ludox colloidal silica exhibits an aromatization activity very close to that of the Cyclar-type catalyst, H-ZSM-5 (Cy) (see Table 2).

TABLE 3

Influence of the amount and size of the quartz particles on the aromatization activity of the hybrid catalyst (H-ZSM-5/Quartz). Si/Al atomic ratio of the zeolite = 30.

| Quartz cocatalyst "x" wt % (1) | Quartz cocatalyst Particle size in microns | Aromatic yield $Y_{Ar}$ (C atom %) | Hydrogen yield (2) |
|---|---|---|---|
| 0 | — | 19.1 | 0.059 |
| 2 | 90 | 19.6 | 0.055 |
| 4 | 90 | 21.6 | 0.064 |
| 7 | 90 | 25.7 | 0.077 |
| 10 | 90 | 29.3 | 0.083 |
| 13 | 90 | 32.8 | 0.101 |
| 13 | 165 | 29.5 | 0.083 |
| 13 | 375 | 29.4 | 0.079 |
| 13 | 675 | 29.1 | 0.079 |

(1) zeolite component = 80 wt %, quartz = "x" wt % and bentonite = (20 − x) wt %
(2) mole of hydrogen produced per C atom of n-butane fed Although it is premature to propose a theoretical explanation to these phenomena, it is clear that hybrid catalysts with supported gallium oxide used as cocatalyst are, surprisingly, more active and selective in the aromatization of light paraffins and olefins than gallium catalysts prepared according to the known procedures.

What is claimed is:

1. A hybrid catalyst for the aromatization of paraffins and olefins, comprising a mixture of a pentasil type zeolite having the structure of ZSM-5 or ZSM-11 and a cocatalyst consisting of a gallium oxide supported by an oxide selected from the group consisting of silica, alumina, and chromium oxide.

2. A hybrid catalyst according to claim 1, wherein said zeolite has the structure of ZSM-5.

3. A hybrid catalyst according to claim 1, wherein the silica is selected from the group consisting of silica gel, colloidal silica and quartz.

4. A hybrid catalyst according to claim 1, further comprising an inert carrier.

5. A hybrid catalyst according to claim 1, wherein the pentasil type zeolite Si/Al atomic ratio is from about 25 to about 50.

6. A hybrid catalyst according to claim 1, wherein the weight ratio of the zeolite to the gallium cocatalyst is from about 4.7 to about 26.7.

7. A hybrid catalyst according to claim 4, wherein the weight percentage of the carrier in the catalyst is from about 3 to about 20, based on the total weight of the catalyst.

8. A hybrid catalyst according to claim 1, wherein the zeolite component is in the acid form.

9. A hybrid catalyst according to claim 1, wherein the content of gallium oxide is from about 0.5 to about 7%, based on the weight of the final catalyst.

10. A hybrid catalyst according to claim 4, wherein the inert carrier is bentonite.

11. A method for the preparation of a hybrid catalyst according to claim 1, comprising:
    evaporating a mixture of a gallium salt and a colloidal silica;
    separating, drying and activating the resulting solid at an elevated temperature;
    mixing the obtained gallium oxide-silica cocatalyst with a pentasil type zeolite having the structure of ZSM-5 or ZSM-11, and embedding the solid mixture in an inert carrier; and
    activating the resulting hybrid catalyst at an elevated temperature.

12. A method for the preparation of a hybrid catalyst according to claim 1, comprising:
    impregnating a gallium salt solution onto silica, alumina or chromium oxide support;
    drying and activating the resulting solid at an elevated temperature;
    mixing the obtained gallium oxide cocatalyst with a pentasil type zeolite having the structure of ZSM-5 or ZSM-11, and embedding the solid mixture in an inert carrier; and
    activating the resulting hybrid catalyst at an elevated temperature.

13. A method according to claim 12, wherein the silica support is silica gel.

14. A method according to claim 12, wherein the silica support is quartz.

15. A method according to claim 12, wherein the alumina support is an activated alumina.

16. A method according to claim 12, wherein the alumina support has a neutral, acidic or basic surface.

17. A method according to claim 12, wherein the chromium oxide is $Cr_2O_3$.

18. A method according to claim 17, wherein the hybrid catalyst is activated under hydrogen atmosphere at an elevated temperature prior to the catalytic operation.

* * * * *